United States Patent Office 3,336,309
Patented Aug. 15, 1967

3,336,309
PREPARATION OF CYANURIC ACID
Robert L. McBrayer, Lincoln Park, and Newlin S. Nichols, Dearborn, Mich., assignors to Wyandotte Chemicals Corporation, Wyandotte, Mich., a corporation of Michigan
No Drawing. Filed Mar. 19, 1965, Ser. No. 441,347
9 Claims. (Cl. 260—248)

This invention relates to the preparation of cyanuric acid. In one aspect, it relates to an improved process for preparing cyanuric acid by pyrolysis of urea.

In the past, cyanuric acid has been prepared by a variety of procedures, the more common of which is to melt and heat urea at atmospheric pressure. However, when urea is heated, it undergoes several physical changes. At about 270° F. urea melts to a clear, low viscosity liquid, at which point ammonia evolution begins almost immediately. As the temperature is raised, the liquid becomes cloudy and more viscous, finally resulting in a heavy gray paste at about 425° F. Continued heating coagulates the paste and then dries it to a solid product at about 435° F. During this heating urea partially volatilizes, isomerizes to ammonium cyanate, decomposes into ammonia, water and carbon dioxide and polymerizes to produce a range of products. Such products include ammonium carbonate and polymers thereof, cyanuric acid and polymers thereof, biuret, triuret, melamine, ammeline, ammelide and dicyandiamide. The final product thus includes cyanuric acid and substantial quantities of the above-mentioned products.

When molten urea is pyrolized to a solid product, the solid product so formed hardens and sets up in the synthesis vessel or reactor causing difficulties. Solids first form at the heating surfaces, hindering the heat conductance, thus decreasing the rate of reaction and making it impossible to drive the reaction to completion. Furthermore, the caked product clings tenaciously to the surfaces within the synthesis vessel so that it can only be removed by laborious means such as drilling or chiselling. Also the yield obtained, based on the urea charged, is usually in the range of 60% or less. This is an uneconomical utilization of the urea feed and necessitates the use of expensive purification procedures to obtain the desired cyanuric acid.

It has been proposed in U.S. Patent No. 2,943,088 to prepare cyanuric acid by heating in a rotating kiln a mixture of urea and cyanuric acid, wherein the cyanuric acid is two to six times the weight of the urea, so that the urea melts through the viscous plastic state into a hard solid state to form a crude reaction product. It has also been proposed in U.S. Patent No. 3,154,545 to contact molten urea with cyanuric acid at such a rate that the ratio of cyanuric acid to urea is in the range of 10:1 to 150:1 to form urea cyanurate. The urea cyanurate is then heated to obtain cyanuric acid. However, these processes result in a product containing as impurities high percentages of the range of products described above, and require very high ratio of urea to cyanuric acid in the feed charge.

It is an object of this invention to provide a simple and inexpensive process for preparing cyanuric acid from urea. Another object is to provide a cyanuric acid product having fine particle size so that no further processing, such as pulverizing or screening, is needed before hydrolysis or other purification. A further object of the invention is to provide a process for producing cyanuric acid by pyrolysis of urea wherein the liquid and pasty stages of the reaction are eliminated. A still further object is to produce a high quality crude cyanuric acid that may be used in plastics manufacture without additional purification. Other objects and advantages of the invention will become apparent to those skilled in the art upon consideration of the accompanying disclosure.

It has been discovered that (1) the buildup of material on the mixer and blades can be essentially eliminated, (2) the hard to handle liquid and pasty stages can be avoided, (3) the evolution of ammonia can be controlled, and (4) the ratio solid of urea to cyanuric acid used can be greatly reduced when urea is slowly added to a heated mass of crude cyanuric acid maintained above the temperature at which the pasty stage occurs.

Broadly speaking, the process of this invention comprises the steps of heating a mass of crude cyanuric acid to from about 432 to 450° F., adding incremental amounts of solid urea to the crude cyanuric acid while maintaining the temperature within the above specified range, and when all the solid urea has been added raising the temperature to at least 535° F. and preferably between 535° F. and the decomposition temperature of cyanuric acid. When conducting the process in a continuous manner, a blend of crude cyanuric acid and urea is fed to a reaction vessel so that the feed enters the reaction vessel above the temperature at which the pasty stage occurs and below the temperature of excess ammonia evolution. Various types of reaction vessels can be used in the practice of this invention including pan dryers, horizontal dryers, ribbon type mixers, paddle mixers, universal type mixers, and kneader type mixers. In the batch process, crude cyanuric acid is charged to the reaction vessel and heated to about 432 to 450° F. An agitator within the reaction vessel ensures a uniform temperature throughout the mass of crude cyanuric acid. Solid urea is then added to the hot crude cyanuric acid at a rate such that the temperature is maintained between 432 and 450° F. when all the solid urea is charged, the temperature is gradually increased to at least 535° F., but not above the temperature at which cyanuric acid decomposes. The product is then dumped from the reaction vessel. The product is composed of free-flowing, light tan granules. The process may be carried out under slightly greater than atmospheric pressure in order to control the vaporization of urea, thus resulting in an increased overall yield. Pressures in the order of from 1 to 2 atmospheres can be employed.

In the continuous process, the heating system heats the equipment to the desired temperature and then the agitator is started. The feed is then started and the feed rate adjusted to maintain a relatively uniform temperature from about 432 to 450° F. at the entrance of the reaction vessel. The agitator moves the feed from the entrance of the reaction vessel toward the discharge end of the reaction vessel. The feed stock is a blend of crude cyanuric acid and solid urea. The product is continuously withdrawn from the equipment. To shut down, the feed is stopped and the equipment allowed to run empty.

In the batch and continuous processes the charge stock consists of from 30 to 80 weight percent of crude cyanuric acid and from 70 to 20 weight percent of urea. Expressed in another way, the feed charge is such as to maintain a urea to cyanuric acid weight ratio of from about 7:3 to 1:4.

Any of the solid forms of urea, such as the powder, pellet or crystalline urea, may be used in the practice of this invention. However, the pelleted form of urea is preferred due to the ease of handling.

The following examples further illustrate the invention and the best mode of carrying out this invention. It is to be understood that the invention is not limited thereto except as defined in the appended claims.

EXAMPLE I

Seventeen (17) pounds of crude cyanuric acid were charged to a 7½ gallon ribbon mixer and heated to 437° F. Thirty (30) pounds of solid urea were added to the mixer at a rate such that the reaction temperature was maintained between 432 and 442° F. The addition time was 1.45 hours. The feed rate was 20.7 pounds per hour. Rate of addition was limited by the heat capacity of the heating unit. When all the solid urea was charged, the temperature was gradually increased to 536° F. and the batch was dumped. The product was composed of free-flowing, non-dusting, light tan granules less than six (6) mesh in size. Buildup in the mixer occurred only at the point on the shaft where the urea hit the shaft as it was charged. Product purity was 96.9% and the product yield was 80.3%.

EXAMPLE II

Fifteen (15) pounds of crude cyanuric acid were charged to a 7½ gallon ribbon mixer and heated to 527° F. Thirty (30) pounds of solid urea were added to the mixer at a rate such that the reaction temperature was maintained between 522 and 532° F. The addition time was 5.4 hours. The feed rate was 5.6 pounds per hour. When all the solid urea was charged, the temperature was gradually increased to 577° F., and the batch was dumped. The product purity was 95.6% and the product yield was 31.5%. As the solid urea was being added in this run, condensable vapors were evolved. The vapors were irritating and caused a burning sensation on tender parts of the skin. The low yield is attributed to loss of urea by vaporization as it was being charged to the hot crude cyanuric acid in the mixer. This example shows that it is necessary in order to avoid irritating vapors and a substantial decrease in overall product yield to limit the temperatures at which the crude cyanuric acid is maintained during the addition of the urea. It was observed that the evolution of ammonia vapors could be controlled by operating the system under a slight pressure, for example up to two atmospheres.

EXAMPLE III

Fifteen (15) pounds of crude cyanuric acid were charged to a ribbon mixer and heated to 437° F. Thirty (30) pounds of solid urea were added to the mixer at a rate such that the reaction temperature was maintained between 432 and 442° F. The addition time was 1.2 hours. The feed rate was 25.0 pounds per hour. Rate of addition was limited by the heat capacity of the heating unit. When all the solid urea was charged, the temperature was gradually increased to 536° F., and the batch was dumped. The product was composed of free-flowing, non-dusting, light tan granules less than six (6) mesh in size. Product purity was 92.0% and the overall product yield was 73.5%.

EXAMPLE IV

A Universal type mixer was used in the run of this example. A Universal type mixer consists essentially of a rectangular trough curved at the bottom to form two-half cylinders, with two blades horizontally disposed therein and actuated by suitable gearing on one or both ends of the trough. The mixer was heated and the agitator started. A small portion of the 18.6 pounds solid urea feed was charged to the mixer. The remainder of the charge was added incrementally to maintain the pasty stage of the reaction mass. The feed rate was 4.2 pounds per hour. The initial temperature of the system was 540° F. The maximum temperature of the product during this run was 430° F. Dry product was obtained in three and one-half hours. Some difficulty was experienced because a portion of the product, consisting of a hard and dense material, tenaciously adhered to the blades of the mixer. The product was an off-white granular material. The product purity was 73% and the overall yield was 61.6%.

EXAMPLE V

This example illustrates five runs of the continuous process for production of cyanuric acid. In the continuous process, the feed stock was a blend of solid urea and crude cyanuric acid wherein the ratio of urea to cyanuric acid was from 1:4 to 1:1. A kneader-type mixer was used in obtaining the data for this example.

| Feed Formula | | Screw Speed, r.p.m. | Final Product Temperature, °F. | Feed Rate, lb./min. | Product Purity, percent |
|---|---|---|---|---|---|
| 1 | 80% crude cyanuric acid, 20% urea. | 20 | 500 | 0.05 | 82.7 |
| 2 | ----do---- | 40 | 500 | 0.1 | 81.4 |
| 3 | 75% crude cyanuric acid, 25% urea. | 22 | 490 | 0.4 | 87.2 |
| 4 | 50% crude cyanuric acid, 50% urea. | 22 | 460 | 0.4 | 81.7 |
| 5 | ----do---- | 22 | 450 | 0.4 | 68. |

Numerous variations and modifications of the invention will occur to those skilled in the art upon reading this disclosure. It is to be understood that all such variations and modifications are intended to come within the spirit and scope of the invention.

We claim:
1. The process for the production of a product consisting essentially of cyanuric acid which comprises the steps of
    (a) charging from 30 to 80 weight percent crude cyanuric acid, based on total charge to a reaction vessel,
    (b) continuously agitating said acid during said charging and during subsequent heating steps,
    (c) heating said acid to a temperature in the range of about 432 to 450° F.,
    (d) adding from 20 to 70 weight percent of solid urea, based on total charge, in incremental amounts and when all of said urea has been added to said acid,
    (e) increasing the temperature to from about 535° F. to the decomposition temperature of said acid, and
    (f) discharging the free-flowing granules of cyanuric acid product from said vessel.
2. The process of claim 1 wherein the incremental amounts of solid urea are added in a manner such that the temperature of the cyanuric acid remains between 432 and 450° F.
3. The process of claim 2 wherein the reaction vessel is maintained at a pressure in the range of one to two atmospheres.
4. The process for the production of cyanuric acid which comprises:
    (a) charging from 30 to 40 weight percent crude cyanuric acid, based on total charge, to a reaction vessel,
    (b) continuously agitating said acid during said charging and during subsequent heating steps,
    (c) heating said acid to from about 432 to 442° F.,
    (d) adding from 60 to 70 weight percent of solid urea, based on total charge, in incremental amounts in such a manner that the temperature is maintained between about 432 and 442° F., and when all the solid urea has been added,
    (e) increasing the temperature gradually until at least 535° F. has been reached, and
    (f) discharging the final product from said vessel.
5. The continuous process for the production of cyanuric acid which comprises:
    (a) continuously feeding a mixture of crude cyanuric acid and urea containing from about 30 to 80 weight percent crude cyanuric acid and from about 20 to 70 weight percent of solid urea to the entrance of a reaction vessel while maintaining a temperature at the entrance of said vessel in the range of about 432 to 450° F.,

(b) increasing the temperature gradually throughout said vessel, and (c) discharging the product from said vessel at a temperature in the range of about 535° F. and the decomposition temperature of said acid.

6. The continuous process for the production of cyanuric acid which comprises:
(a) continuously feeding a mixture of crude cyanuric acid and urea containing from about 30 to 80 weight percent crude cyanuric acid and from about 20 to 70 weight percent of solid urea to the entrance of a reaction vessel,
(b) adjusting the feed rate so that a temperature between about 432 and about 450° F. is maintained at the entrance of said vessel,
(c) gradually increasing the temperature in said vessel until a temperature in the range of 535 to 600° F. is obtained at the discharge end of said vessel, and
(d) continuously discharging the product from said vessel.

7. The continuous process for the production of cyanuric acid which comprises:
(a) continuously feeding a mixture of crude cyanuric acid and solid urea containing from about 30 to 80 weight percent crude cyanuric acid and from about 20 to 70 weight percent of solid urea to the entrance of a reaction vessel,
(b) continuously moving said mixture from the entrance of said vessel toward the discharge end of said vessel,
(c) adjusting the feed rate so that a temperature in the range of about 432 to 450° F. is maintained at the entrance of said vessel,
(d) gradually increasing the temperature in said vessel until a temperature in the range of about 535 to 600° F. is obtained at the discharge end of said vessel, and (e) continuously discharging the product from said vessel.

8. A process for converting solid urea to a product consisting substantially of cyanuric acid which comprises:
(a) continuously adding solid urea to a continuously agitated mass of crude cyanuric acid maintained at at temperature in the range of 432 to about 450° F. wherein the ratio of urea to cyanuric acid is from about 1:4 to 7:3 and when all the solid urea has been added,
(b) increasing the temperature gradually to from about 535° F. to the decomposition temperature of cyanuric acid.

9. A process for continuously converting solid urea to a product consisting essentially of cyanuric acid which comprises:
(a) continuously feeding a mixture of urea and crude cyanuric acid, wherein the urea to cyanuric acid weight ratio is maintained between 1:4 to 7:3, to the entrance of a reaction vessel,
(b) maintaining a temperature of the mixture in the range of about 432 and 442° F. at the entrance to solid vessel in order to avoid the pasty stage of the reaction,
(c) gradually increasing the temperature in said vessel until a temperature in the range of about 535° F. and the decomposition temperature of said acid is obtained, and
(d) removing the free-flowing, granular product from said vessel.

References Cited

UNITED STATES PATENTS 2,943,088   6/1960   Westfall _____ 260—248

WALTER A. MODANCE, *Primary Examiner.*

JOHN M. FORD, *Assistant Examiner.*

UNITED STATES PATENT OFFICE
CERTIFICATE OF CORRECTION

Patent No. 3,336,309                                        August 15, 1967

Robert L. McBrayer et al.

It is hereby certified that error appears in the above numbered patent requiring correction and that the said Letters Patent should read as corrected below.

Column 6, line 23, for "solid" read --said--.

Signed and sealed this 15th day of October 1968.

(SEAL)
Attest:

Edward M. Fletcher, Jr.                                    EDWARD J. BRENNER

Attesting Officer                                                Commissioner of Patents